US012558970B2

(12) United States Patent
Deshpande et al.

(10) Patent No.: US 12,558,970 B2
(45) Date of Patent: Feb. 24, 2026

(54) ROTOR ANGLE LIMIT FOR STATIC HEATING OF ELECTRIC MOTOR

(71) Applicant: Atieva, Inc., Newark, CA (US)

(72) Inventors: Yateendra Deshpande, Sunnyvale, CA (US); Sameer Sudhir Deshmukh, Milpitas, CA (US)

(73) Assignee: Atieva, Inc., Newark, CA (US)

( * ) Notice: Subject to any disclaimer, the term of this patent is extended or adjusted under 35 U.S.C. 154(b) by 125 days.

(21) Appl. No.: 18/704,784

(22) PCT Filed: Oct. 26, 2022

(86) PCT No.: PCT/US2022/078706
§ 371 (c)(1),
(2) Date: Apr. 25, 2024

(87) PCT Pub. No.: WO2023/076942
PCT Pub. Date: May 4, 2023

(65) Prior Publication Data
US 2025/0001875 A1       Jan. 2, 2025

Related U.S. Application Data

(60) Provisional application No. 63/263,180, filed on Oct. 28, 2021.

(51) Int. Cl.
B60L 15/20         (2006.01)

(52) U.S. Cl.
CPC ....... B60L 15/2009 (2013.01); B60L 15/2045 (2013.01); B60L 2240/423 (2013.01); B60L 2240/429 (2013.01)

(58) Field of Classification Search
CPC ............. B60L 15/2009; B60L 15/2045; B60L 2240/429; H02P 29/62; H02P 21/22
See application file for complete search history.

(56) References Cited

U.S. PATENT DOCUMENTS

| 2002/0017891 A1 | 2/2002 | Honma et al. |
| 2005/0194923 A1 | 9/2005 | Huang et al. |

(Continued)

FOREIGN PATENT DOCUMENTS

| CN | 111355000 B | * 11/2021 | .......... H01M 10/633 |
| JP | 2009027830 A | * 2/2009 | |

OTHER PUBLICATIONS

Translation of CN111355000B (Year: 2021).*

(Continued)

*Primary Examiner* — Scott A Browne
*Assistant Examiner* — Jisun Choi
(74) *Attorney, Agent, or Firm* — Brake Hughes Bellermann LLP

(57)          ABSTRACT

A method of determining rotor angle limits for static heating of an electric motor comprises: applying a brake to a wheel of a vehicle, wherein the vehicle has an electric motor; while the brake is applied, providing a first current to the electric motor to generate first torque not exceeding a brake torque limit of the brake; while the brake is applied, providing a second current to the electric motor to generate second torque, the second current being opposite, and about equal, to the first current; determining a first rotor rotation angle associated with the first current, and a second rotor rotation angle associated with the second current; and setting the first and second rotor rotation angles as first and second rotor angle limits, respectively, for static heating of the electric motor.

17 Claims, 6 Drawing Sheets

(56)                    References Cited

U.S. PATENT DOCUMENTS

| | | | |
|---|---|---|---|
| 2011/0118940 | A1 | 5/2011 | Kariatsumari et al. |
| 2012/0261397 | A1* | 10/2012 | Schwarz ................. B60L 58/13 |
| | | | 219/202 |
| 2012/0293102 | A1* | 11/2012 | Kock ...................... H02P 29/62 |
| | | | 318/473 |
| 2016/0221469 | A1* | 8/2016 | Cheng ...................... B60K 6/48 |
| 2017/0088007 | A1* | 3/2017 | Melendez ............. B60L 53/302 |
| 2017/0129340 | A1 | 5/2017 | Murthy et al. |
| 2018/0072295 | A1 | 3/2018 | Masuda |
| 2022/0077518 | A1* | 3/2022 | Ling ...................... B60H 1/143 |
| 2022/0158574 | A1* | 5/2022 | Hao ........................ B60L 58/27 |
| 2023/0062270 | A1* | 3/2023 | Li ......................... H01M 10/48 |

OTHER PUBLICATIONS

Translation of JP2009027830A (Year: 2009).*
European search report of European application No. EP 22888462.3
dated Jul. 30, 2025 (Year: 2025).*
International preliminary report on patentability of PCT application
No. PCT/US2022/078706, mailed Feb. 2, 2023 (Year: 2023).*
International Search Report and Written Opinion for PCT Applica-
tion No. PCT/US2022/078706, mailed on Feb. 2, 2023, 11 pages.

* cited by examiner

600

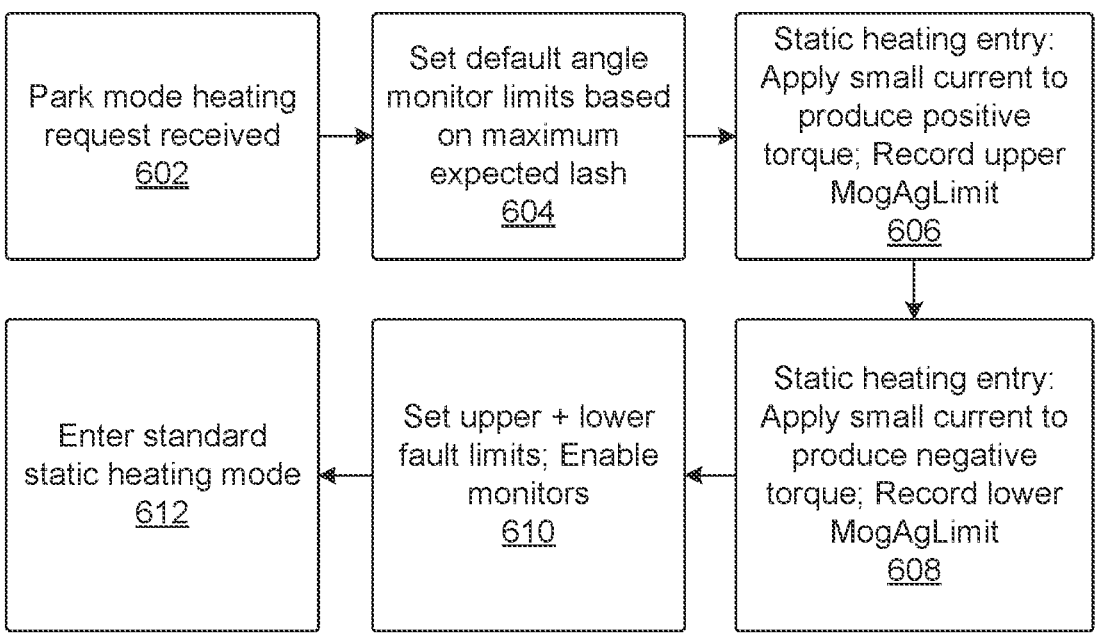

```
┌─────────────────┐   ┌─────────────────┐   ┌─────────────────┐
│  Park mode      │   │ Set default angle│   │ Static heating   │
│  heating        │──▶│ monitor limits   │──▶│ entry: Apply     │
│  request        │   │ based on maximum │   │ small current to │
│  received       │   │ expected lash    │   │ produce positive │
│  602            │   │ 604              │   │ torque; Record   │
│                 │   │                  │   │ upper MogAgLimit │
│                 │   │                  │   │ 606              │
└─────────────────┘   └─────────────────┘   └─────────────────┘
                                                      │
                                                      ▼
┌─────────────────┐   ┌─────────────────┐   ┌─────────────────┐
│  Enter standard │   │ Set upper +     │   │ Static heating   │
│  static heating │◀──│ lower fault     │◀──│ entry: Apply     │
│  mode           │   │ limits; Enable  │   │ small current to │
│  612            │   │ monitors        │   │ produce negative │
│                 │   │ 610             │   │ torque; Record   │
│                 │   │                 │   │ lower MogAgLimit │
│                 │   │                 │   │ 608              │
└─────────────────┘   └─────────────────┘   └─────────────────┘
```

FIG. 6

ROTOR ANGLE LIMIT FOR STATIC HEATING OF ELECTRIC MOTOR

CROSS-REFERENCE TO RELATED APPLICATION

This application is a 35 U.S.C. § 371 National Phase Entry Application from PCT Application No. PCT/US2022/078706, filed on Oct. 26, 2022, entitled "ROTOR ANGLE LIMIT FOR STATIC HEATING OF ELECTRIC MOTOR", and designating the U.S., which claims priority to U.S. Provisional Patent Application No. 63/263,180, filed Oct. 28, 2021, and entitled "ROTOR ANGLE LIMIT FOR STATIC HEATING OF ELECTRIC MOTOR," the disclosures of which are incorporated by reference herein in their entireties.

TECHNICAL FIELD

This document relates to a rotor angle limit for static heating of an electric motor.

BACKGROUND

In recent years, electric vehicle (EV) technology has continued to develop. An EV has an onboard battery pack or other energy storage. Cells used in battery packs may be associated with a minimum temperature below which the cells cannot be charged. Also, for an optimum charging efficiency, and/or to optimize discharging, the cells may need to be at a substantially higher temperature than the minimum temperature.

In some previous approaches, a separate heating element has been provided for the battery pack. This heating element can be powered from the battery pack or from the grid. However, the heating element takes up space and adds cost and weight to the vehicle design. Another approach may be to use the vehicle's electric motor to heat the battery pack. However, this approach may be subject to the risk of generating knocking sounds and/or jerking the vehicle while stationary.

SUMMARY

In a first aspect, a method of determining rotor angle limits for static heating of an electric motor comprises: applying a brake to a wheel of a vehicle, wherein the vehicle has an electric motor; while the brake is applied, providing a first current to the electric motor to generate first torque not exceeding a brake torque limit of the brake; while the brake is applied, providing a second current to the electric motor to generate second torque, the second current being opposite, and about equal, to the first current; determining a first rotor rotation angle associated with the first current, and a second rotor rotation angle associated with the second current; and setting the first and second rotor rotation angles as first and second rotor angle limits, respectively, for static heating of the electric motor.

Implementations can include any or all of the following features. The method further comprises taking into account a gear ratio when selecting the first current. The first current is a positive current and the second current is a negative current about equal to the positive current. The static heating is performed and the rotor rotation angle exceeds either of the first and second rotor angle limits during the static heating, the method further comprising determining new first and second rotor angle limits based on applying the negative current before the positive current. The method further comprises subsequently determining new first and second rotor angle limits based on applying the second current before the first current. Determining the first and second rotor rotation angles comprises determining where the rotor rotation angle becomes constant. The electric motor is coupled to a gearbox, and wherein determining where the rotor rotation angle becomes constant takes into account a lash of the gearbox. The method further comprises setting, before providing the first and second currents, other rotor angle limits based on the lash of the gearbox. The first and second currents are provided in response to a request to provide the static heating. The vehicle has first and second electric motors, wherein the first and second rotor angle limits are set for the first electric motor, and wherein third and fourth rotor angle limits are set for the second electric motor.

In a second aspect, a method of performing static heating of an electric motor comprises: applying a brake to a wheel of a vehicle that has an electric motor; while the brake is applied, providing a current to the electric motor for static heating, the current selected so as to not produce torque in the electric motor; monitoring a rotor rotation angle while providing the current; and modifying the current in response to the rotor rotation angle exceeding a rotor angle limit for the static heating.

Implementations can include any or all of the following features. The method further comprises setting the rotor angle limit in response to a request for the static heating. First and second rotor angle limits, and wherein setting the first and second rotor angle limits comprises: applying the brake to a wheel of the vehicle; while the brake is applied, providing a first current to the electric motor to generate first torque not exceeding a brake torque limit of the brake; while the brake is applied, providing a second current to the electric motor to generate second torque, the second current being opposite, and about equal, to the first current; determining a first rotor rotation angle associated with the first current, and a second rotor rotation angle associated with the second current; and setting the first and second rotor rotation angles as the first and second rotor angle limits, respectively, for the static heating of the electric motor. The vehicle has first and second electric motors, wherein the first and second rotor angle limits are set for the first electric motor, and wherein third and fourth rotor angle limits are set for the second electric motor. Modifying the current comprises setting the current to zero. The method further comprises, after modifying the current, subsequently determining a new rotor angle limit based on applying current in a different order.

BRIEF DESCRIPTION OF DRAWINGS

FIG. 6 shows a flowchart of an example of a method.

Like reference symbols in the various drawings indicate like elements.

DETAILED DESCRIPTION

This document describes examples of systems and techniques for providing an angle monitor for static heating of an electric motor. The angle monitor can eliminate or reduce the occurrence of unintended torque production during static heating. For example, this can avoid knocking or jerking of the vehicle while parked. The angle monitor can operate based on one or more rotor angle limits for the electric motor. In some implementations, the rotor angle limit(s) can be determined in a pre-heating session designed to avoid overpowering the parking brakes or hydraulic brakes of the vehicle. For example, the pre-heating session can involve providing controlled amounts of torque that are known not to exceed the brake limits. The thus determined rotor position can later serve as a basis for monitoring any rotor rotation during the static heating.

Examples described herein refer to a vehicle. A vehicle is a machine that transports passengers or cargo, or both. A vehicle can have one or more motors using at least one type of fuel or other energy source (e.g., electricity). Examples of vehicles include, but are not limited to, cars, trucks, and buses. The number of wheels can differ between types of vehicles, and one or more (e.g., all) of the wheels can be used for propulsion of the vehicle. The vehicle can include a passenger compartment accommodating one or more persons. An EV can be powered exclusively by electricity, or can use one or more other energy sources in addition to electricity, to name just a few examples. As used herein, an EV includes an onboard energy storage, sometimes referred to as a battery pack, to power one or more electric motors. Two or more EVs can have different types of energy storages and/or different sizes thereof.

Examples described herein refer to an electric motor. As used herein, an electric motor can be either a permanent magnet motor, an induction motor, or a synchronous reluctance motor.

Examples described herein refer to static heating. As used herein, static heating involves deliberately operating an electric motor in a way that is designed to not rotate its rotor, that is, with the intention to not produce any torque while powering the electric motor.

Figure 1:
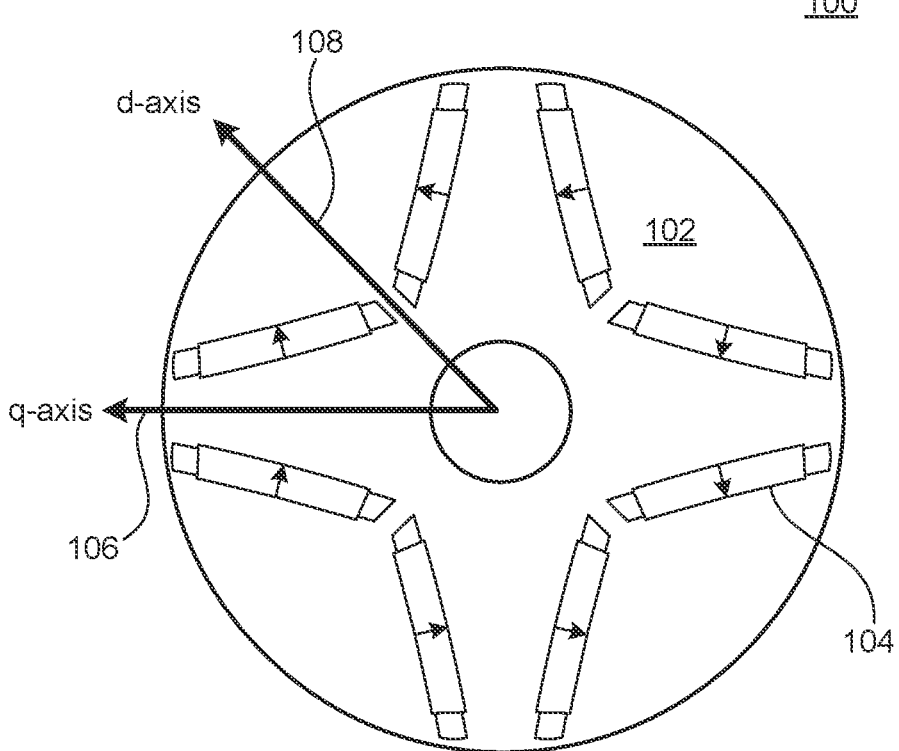
FIG. 1 shows an example of a rotor of a permanent magnet electric motor.

FIG. 1 shows an example of a rotor 100 of a permanent magnet electric motor. The rotor 100 can be used with one or more other examples described elsewhere herein. The rotor 100 is shown in an axial view with the axis of rotation in the center, extending in a direction perpendicular to the plane of the drawing. For example, the illustrated view can show a lamination 102 of multiple stacked rotor laminations that make up the rotor. The rotor 100 includes permanent magnets 104. The permanent magnets 104 are interior magnets, and surface-mounted magnets can be used in another implementation. Different types of the permanent magnets 104 can be used. Different numbers of the permanent magnets 104 can be used. For example, here the rotor 100 includes eight of the permanent magnets 104 distributed over the lamination 102. Here, a q-axis inductance 106 and a d-axis inductance 108 are shown extending from the rotation axis of the rotor 100. These vector can be calculated in designing the motor to evaluate its performance characteristics.

Figure 2:
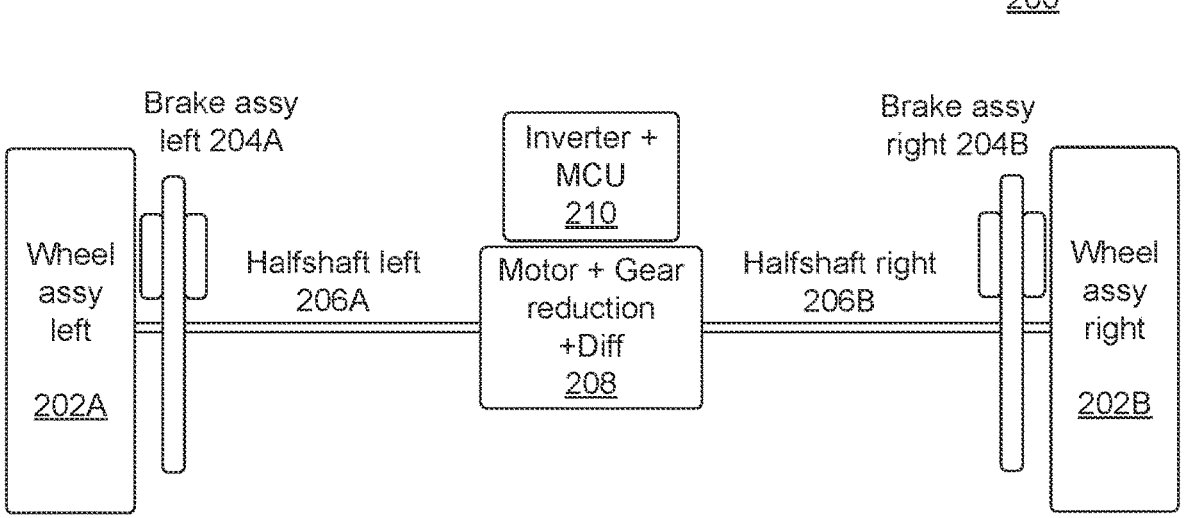
FIG. 2 schematically shows an example of a drivetrain for a vehicle.

FIG. 2 schematically shows an example of a drivetrain 200 for a vehicle. The drivetrain 200 can be used with one or more other examples described elsewhere herein. The drivetrain 200 includes left and right wheel assemblies 202A-202B, respectively. For example, any of various different types and/or sizes of wheel can be used. While this example shows two drive wheels, in some implementations a vehicle can have a greater number (e.g., four or more) or smaller number (i.e., one) of drive wheels.

The drivetrain 200 includes left and right brake assemblies 204A-204B, respectively. The left and right brake assemblies 204A-204B represent the presence of at least two separate braking systems in the vehicle. First, they represent the brakes that are normally applied while the vehicle is moving to reduce the speed or stop the vehicle. This kind of brake can include, but is not limited to, disc brakes and/or drum brakes. For example, this type of brake is sometimes also referred to as a hydraulic brake, and can be engaged at varying degrees with a foot pedal. Second, the left and right brake assemblies 204A-204B represent that the vehicle has a parking brake (sometimes referred to as an emergency brake). This kind of brake can involve, but is not limited to, application of disc brake calipers or a separate drum brake. For example, this type of brake can be automatically applied when the vehicle is in park mode, or can be actuated by hand lever or electronic button, or by a pedal separate from the brake pedal.

The left and right brake assemblies 204A-204B can be associated with one or more brake torque limits. In some implementations, the brake torque limit corresponds to the amount of torque applied to the brake assembly that is expected to cause the brake to slip. For example, the brake torque limit can be reported by the manufacturer of the brake or can be determined by testing. Here, a brake torque limit associated with the left or right brake assemblies 204A-204B will be referred to as T Newton-meters (Nm).

The drivetrain 200 includes left and right half-shafts 206A-206B, respectively. The left half-shaft 206A provides motor torque to the left wheel assembly 202A by way of a wheel hub, and the right half-shaft 206B provides motor torque to the right wheel assembly 202B by way of another wheel hub.

The drivetrain 200 includes a motor housing 208 that includes an electric motor, a gearbox (e.g., a planetary gear assembly) and a differential (e.g., inside a rotor shaft). The electric motor includes a rotor and a stator. The drivetrain 200 includes electronics 210. For example, the electronics 210 includes an inverter providing electricity to the motor, and a motor control unit (MCU) which can execute software (e.g., firmware) for controlling the inverter. For example, the MCU can include a microprocessor of field-programmable logic array. The motor housing 208 can include a rotor sensor that determines the rotation angle of the rotor.

The left and right half-shafts 206A-206B have a stiffness that allows torsion under load. When the electric motor applies torque, the left and right half-shafts 206A-206B can twist somewhat, like a torsional spring. That is, the left and right half-shafts 206A-206B will allow some amount of rotor rotation.

The electric motor can have a respective torque limit associated with the brake torque limit of the left or right brake assemblies 204A-204B. The present subject matter can be used for drive units with or without a differential assembly. For example, without a differential assembly a separate motor can drive each wheel independently. When a differential is used, the motor torque limit can be a lower number than the brake torque limit due to the gear ratio. Here, the motor torque limit will be referred to as $\tau$ Nm. For example, the brake torque limit can be expressed as $T = r_g \tau$, where $r_g$ is the gear ratio of the gearbox. That is, while the vehicle is parked, the electric motor should not produce more than τ Nm in order to avoid slippage in the left or right brake assemblies 204A-204B.

Figure 3:
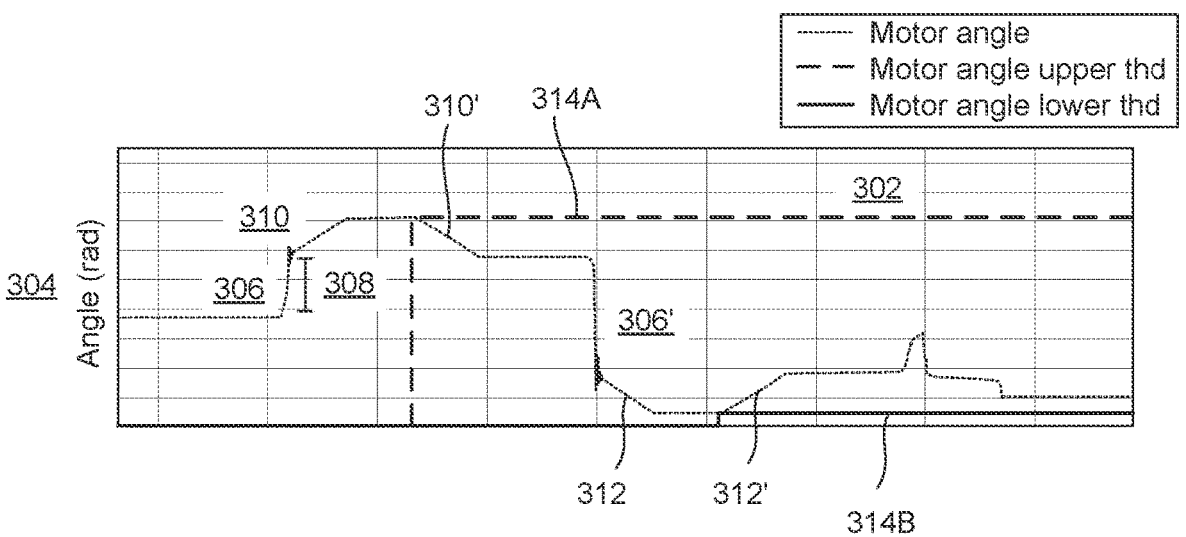
FIG. 3 shows a diagram with a graph of rotor rotation angles.
Figure 4:
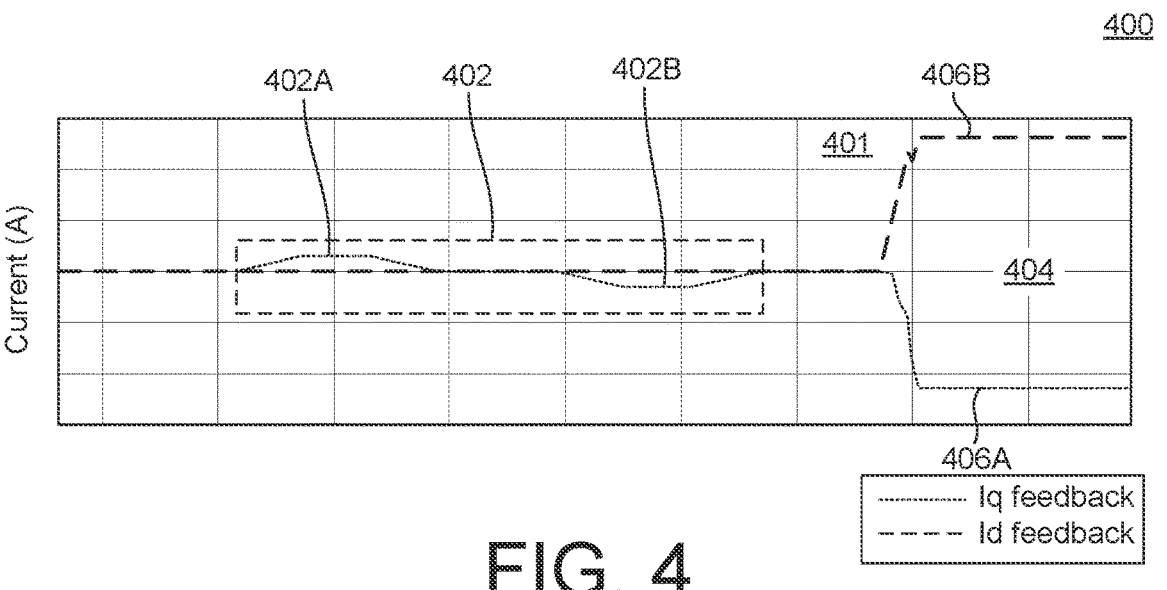
FIG. 4 shows a diagram with a graph of stator currents that can be applied to generate the rotor rotation angles of FIG. 3.

FIG. 3 shows a diagram 300 with a graph 302 of rotor rotation angles. In the diagram 300, time is indicated on the horizontal axis and rotor rotation angles (e.g., in radians) are indicated on the vertical axis. FIG. 4 shows a diagram 400 with a graph 401 of stator currents that can be applied to generate the rotor rotation angles of FIG. 3. In the diagram 400, time is indicated on the horizontal axis and current (e.g., in amperes) is indicated on the vertical axis. The diagrams 300 and/or 400 can be used with one or more other examples described elsewhere herein.

When a vehicle having a battery pack for an electric motor is parked and its brakes are on, static heating of the battery pack can be performed to condition the battery pack for an upcoming charging session. To avoid unintended torque production during the static heating, one or more rotor angle limits can be defined, and applied during the static heating, for example as described in the following.

In response to a request for static heating, an angle limit calculation 402 can be initiated. The angle limit calculation 402 is performed with a brake applied to the drive wheel(s). Before the angle limit calculation 402 begins, the stationary rotor has an arbitrary rotational position as determined by a rotor sensor, here indicated as position 304. The angle limit calculation 402 can begin with providing a current 402A to the electric motor. The current 402A is selected to generate a torque that does not exceed a brake torque limit of the brake. For example, if the brake torque limit is T Nm, the electric motor should not produce more than τ Nm of torque. The current 402A can be positive, meaning that it corresponds to generating τ Nm of torque in a positive direction.

When the current 402A is provided, the rotor rotation angle can undergo a change 306. In some implementations, the change 306 is an increase in rotor rotation angle at a relatively steep rate. For example, the change 306 corresponds to rotor rotation due to a lash in the gearbox. Each gearbox can have a finite amount of lash in its gears, and such lash can vary from motor to motor and also over the lifetime of the gearbox. Here, an expected lash 308 is schematically illustrated as a change in rotor rotation angle.

After the change 306, the rotor rotation angle can enter a phase 310 where the rotor rotation angle increases and eventually becomes planar. That is, the planar portion of the phase 310 can correspond to a maximum displacement of the rotor due to the current 402A. Thereafter, the rotor rotation angle can enter a phase 310' of decreasing angles corresponding to the phase 310, and temporarily reach a constant angle level.

The angle limit calculation 402 can then provide a current 402B to the electric motor. The current 402B can be opposite to the current 402A and can be about equal thereto. For example, the current 402B can be negative, meaning that it corresponds to generating τ Nm of torque in a negative direction.

When the current 402B is provided, the rotor rotation angle can undergo a change 306' corresponding to the change 306 due to the lash. In some implementations, the change 306' is a decrease in rotor rotation angle at a relatively steep rate. After the change 306', the rotor rotation angle can enter a phase 312 where the rotor rotation angle decreases and eventually becomes planar. That is, the planar portion of the phase 312 can correspond to a minimum displacement of the rotor due to the current 402B. Thereafter, the rotor rotation angle can enter a phase 312' of increasing angles corresponding to the phase 312.

That is, the planar portion of the phase 310 and the planar portion of the phase 312 can correspond to respective rotor rotation angles. These rotor rotation angle values can be set to be rotor angle limits 314A-314B, respectively, for static heating.

After the angle limit calculation 402, static heating 404 can be performed. The static heating 404 is performed with a brake applied to the drive wheel(s). While the brake is applied, one or more currents 406A-406B can be provided to the electric motor. The currents 406A-406B are selected so as to not produce torque in the electric motor. Rather, the currents 406A-406B will generate heat in the electric motor but are not intended to cause torque production. For example, the current 406A can be a q current (e.g., associated with the q-axis inductance 106 in FIG. 1), and the current 406B can be a d current (e.g., associated with the d-axis inductance 108 in FIG. 1).

While the currents 406A-406B are provided, the rotor rotation angle can be monitored. If the rotor rotation angle exceeds either of the rotor angle limits 314A-314B, the currents 406A-406B can be modified. For example, the currents 406A-406B can then be terminated or otherwise changed. This can seek to prevent that unintended torque production due to the currents 406A-406B reaches a level where it would exceed the brake torque limits of the brakes.

In some implementations, if the currents 406A-406B are modified based on the rotor angle limits 314A-314B before the static heating 404 is finished, the static heating 404 can be terminated prematurely. In some implementations, on the other hand, a modified version of the angle limit calculation 402 can be performed. The modified version can involve applying the currents 402A-402B in the opposite order. That is, the current 402B can then first be performed, and thereafter the current 402A. New rotor angle limits can be determined based on this modified version of the angle limit calculation 402. The static heating 404 can then be continued with the new rotor angle limits substituted for the earlier rotor angle limits.

Figure 5:
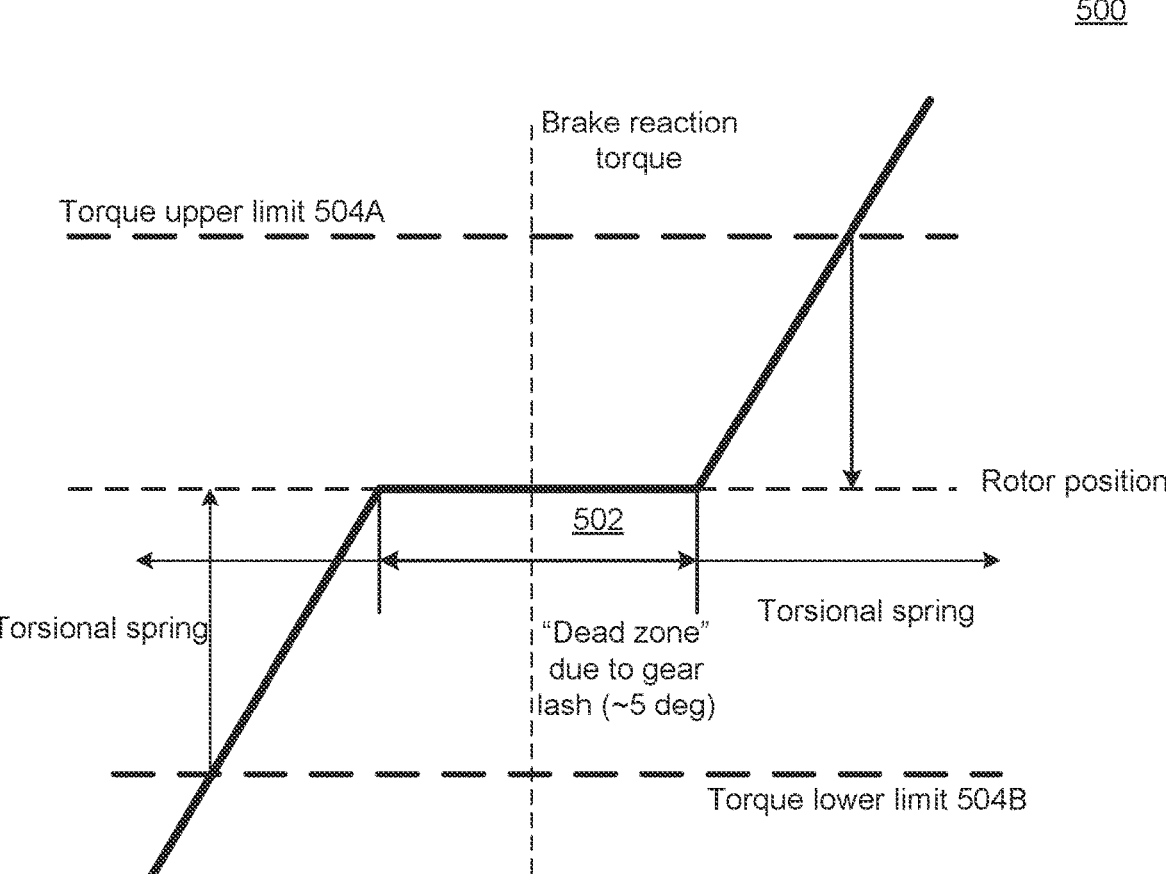
FIG. 5 shows an example of lash in a gearbox being indicated in a torque-angle diagram for a rotor.

FIG. 5 shows an example 500 of lash 502 in a gearbox being indicated in a torque-angle diagram for a rotor. The example 500 can be used with one or more other examples described elsewhere herein. In the example 500, rotor position (e.g., rotor rotation angle) is indicated on the horizontal axis, and brake reaction torque is indicated on the vertical axis. The brakes may be associated with respective brake torque limits 504A-504B. In an ideal scenario, the graph would be a straight line due to the relationship τ=kθ, where τ is the torque, θ is the angular displacement, and k is a spring constant associated with the drivetrain (e.g., with the particular half-shaft of the wheel assembly). However, the relationship is not linear due to the lash 502 of the gears in the gearbox. Moreover, the lash 502 varies in length (e.g., between motors and/or over time) and its position along the horizontal axis is not known before torque is applied. As such, the error or discrepancy in the brake reaction torque may be great enough that fixed rotor rotation limits cannot be used. Therefore, rotor rotation limits can be determined as described herein, and be monitored during the static heating.

FIG. 6 shows a flowchart of an example of a method 600. The method 600 can be used with one or more other examples described elsewhere herein. More or fewer operations can be performed. Two or more operations can be performed in a different order unless otherwise indicated.

At operation 602, a request for static heating can be received while the vehicle is in park mode. For example, the vehicle then has one or more brakes applied to the drive wheel(s). The request can be generated upon arrival of the vehicle at a charging station, or in preparation for a pre-planned charging session to occur while being parked, to name just two examples.

At operation 604, a default angle monitor limit can be set. In some implementations, this can be based on the expected lash 308 (FIG. 3). For example, the expected lash 308 can be extended in each direction from the position 304 as a way of establishing default torque protection before the rotor angle limits 314A-314B are defined.

At operation 606, an angle limit calculation can be initiated. A small amount of current can be applied to generate positive torque that does not exceed the brake torque limit. For example, a known control method fo producing predictable torque of τ Nm can be applied. Based on this current, a maximum rotor angle can be recorded.

At operation 608, another angle limit calculation can be initiated. A small amount of current can be applied to generate negative torque that does not exceed the brake torque limit. Based on this current, a minimum rotor angle can be recorded.

At operation 610, respective rotor angle limits can be set based on the maximum and minimum rotor angles.

At operation 612, static heating can be performed for a predetermined time, or until a temperature criterion is met. If the static heating is interrupted, one or more of the operations can be performed again. For example, the operations 606 and 608 can be performed in the opposite order, and new rotor angle limits can be set in operation 610 based on the newly performed operations 608 and 606.

Figure 7:
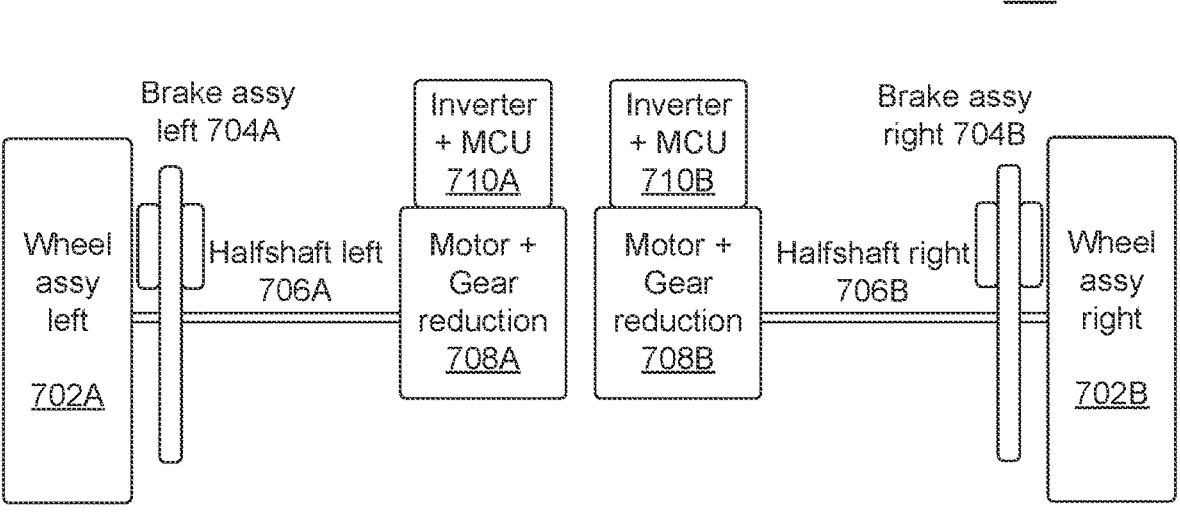
FIG. 7 schematically shows another example of a drivetrain for a vehicle.

FIG. 7 schematically shows another example of a drivetrain 700 for a vehicle. The drivetrain 700 can be used with one or more other examples described elsewhere herein. The drivetrain 700 includes left and right wheel assemblies 702A-702B, respectively. For example, any of various different types and/or sizes of wheel can be used. While this example shows two drive wheels, in some implementations a vehicle can have a greater number (e.g., four or more) or smaller number (i.e., one) of drive wheels.

The drivetrain 700 includes left and right brake assemblies 704A-704B, respectively. The left and right brake assemblies 704A-704B represent the presence of at least two separate braking systems in the vehicle. First, they represent the brakes that are normally applied while the vehicle is moving to reduce the speed or stop the vehicle. This kind of brake can include, but is not limited to, disc brakes and/or drum brakes. For example, this type of brake is sometimes also referred to as a hydraulic brake, and can be engaged at varying degrees with a foot pedal. Second, the left and right brake assemblies 704A-704B represent that the vehicle has a parking brake (sometimes referred to as an emergency brake). This kind of brake can involve, but is not limited to, application of disc brake calipers or a separate drum brake. For example, this type of brake can be automatically applied when the vehicle is in park mode, or can be actuated by hand lever or electronic button, or by a pedal separate from the brake pedal.

The left and right brake assemblies 704A-704B can be associated with one or more brake torque limits. In some implementations, the brake torque limit corresponds to the amount of torque applied to the brake assembly that is expected to cause the brake to slip. For example, the brake torque limit can be reported by the manufacturer of the brake or can be determined by testing. Here, a brake torque limit associated with the left or right brake assemblies 704A-704B will be referred to as T Newton-meters (Nm).

The drivetrain 700 includes left and right half-shafts 706A-706B, respectively. The left half-shaft 706A provides motor torque to the left wheel assembly 702A by way of a wheel hub, and the right half-shaft 706B provides motor torque to the right wheel assembly 702B by way of another wheel hub.

The drivetrain 700 includes separate motors for the left and right half-shafts 706A-706B. A motor housing 708A includes at least an electric motor, and a motor housing 708B includes at least an electric motor. Each of the electric motors includes a rotor and a stator. The drivetrain 700 includes electronics 710A-710B for the respective electric motors. For example, each of the electronics 710A-710B includes an inverter providing electricity to the motor, and a motor control unit (MCU) which can execute software (e.g., firmware) for controlling the inverter. For example, the MCU can include a microprocessor of field-programmable logic array. Each of the motor housings 708A-708B can include a respective rotor sensor that determines the rotation angle of the rotor.

Similar to the description above regarding FIG. 2, respective rotor angle limits can be determined for each of the electric motors of the drivetrain 700.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method of determining rotor angle limits for static heating of an electric motor, the method comprising:

applying a brake to a wheel of a vehicle, wherein the vehicle has an electric motor;

while the brake is applied, providing a first current to the electric motor to generate first torque not exceeding a brake torque limit of the brake;

while the brake is applied, providing a second current to the electric motor to generate second torque, the second current being opposite, and about equal, to the first current;

determining a first rotor rotation angle associated with the first current, and a second rotor rotation angle associated with the second current; and setting the first and second rotor rotation angles as first and second rotor angle limits, respectively, for static heating of the electric motor.

2. The method of claim 1, further comprising taking into account a gear ratio when selecting the first current.

3. The method of claim 1, wherein the first current is a positive current and the second current is a negative current about equal to the positive current.

4. The method of claim 3, wherein the static heating is performed and the rotor rotation angle exceeds either of the first and second rotor angle limits during the static heating, the method further comprising determining new first and second rotor angle limits based on applying the negative current before the positive current.

5. The method of claim 1, further comprising subsequently determining new first and second rotor angle limits based on applying the second current before the first current.

6. The method of claim 1, wherein determining the first and second rotor rotation angles comprises determining where the rotor rotation angle becomes constant.

7. The method of claim 6, wherein the electric motor is coupled to a gearbox, and wherein determining where the rotor rotation angle becomes constant takes into account a lash of the gearbox.

8. The method of claim 7, further comprising setting, before providing the first and second currents, other rotor angle limits based on the lash of the gearbox.

9. The method of claim 1, wherein the first and second currents are provided in response to a request to provide the static heating.

10. The method of claim 1, wherein the vehicle has first and second electric motors, wherein the first and second rotor angle limits are set for the first electric motor, and wherein third and fourth rotor angle limits are set for the second electric motor.

11. A method of performing static heating of an electric motor, the method comprising:

applying a brake to a wheel of a vehicle that has an electric motor;

while the brake is applied, providing a current to the electric motor for static heating, the current selected so as to not produce torque in the electric motor;

monitoring a rotor rotation angle while providing the current; and modifying the current in response to the rotor rotation angle exceeding a rotor angle limit for the static heating.

12. The method of claim 11, further comprising setting the rotor angle limit in response to a request for the static heating.

13. The method of claim 12, wherein first and second rotor angle limits, and wherein setting the first and second rotor angle limits comprises:

applying the brake to a wheel of the vehicle;

while the brake is applied, providing a first current to the electric motor to generate first torque not exceeding a brake torque limit of the brake;

while the brake is applied, providing a second current to the electric motor to generate second torque, the second current being opposite, and about equal, to the first current;

determining a first rotor rotation angle associated with the first current, and a second rotor rotation angle associated with the second current; and setting the first and second rotor rotation angles as the first and second rotor angle limits, respectively, for the static heating of the electric motor.

14. The method of claim 13, wherein the vehicle has first and second electric motors, wherein the first and second rotor angle limits are set for the first electric motor, and wherein third and fourth rotor angle limits are set for the second electric motor.

15. The method of claim 11, wherein modifying the current comprises setting the current to zero.

16. The method of claim 11, further comprising, after modifying the current, subsequently determining a new rotor angle limit based on applying current in a different order.

17. A system configured to perform the method of claim 1.

* * * * *